United States Patent
Murota et al.

(10) Patent No.: US 10,258,964 B2
(45) Date of Patent: Apr. 16, 2019

(54) COMPOSITE OXIDE

(71) Applicant: SANTOKU CORPORATION, Kobe-shi, Hyogo (JP)

(72) Inventors: Tadatoshi Murota, Kobe (JP); Shigeru Ono, Kobe (JP); Tomonori Tahara, Kobe (JP)

(73) Assignee: SANTOKU CORPORATION, Kobe-shi, Hyogo (JP)

( * ) Notice: Subject to any disclaimer, the term of this patent is extended or adjusted under 35 U.S.C. 154(b) by 193 days.

(21) Appl. No.: 15/293,661

(22) Filed: Oct. 14, 2016

(65) Prior Publication Data
US 2017/0028384 A1 Feb. 2, 2017

Related U.S. Application Data

(63) Continuation of application No. 14/358,780, filed as application No. PCT/JP2012/078324 on Nov. 1, 2012, now abandoned.

(30) Foreign Application Priority Data

Nov. 16, 2011 (JP) ................. 2011-267329

(51) Int. Cl.
| | | |
|---|---|---|
| *B01J 23/10* | (2006.01) | |
| *C01G 25/00* | (2006.01) | |
| *B01D 53/94* | (2006.01) | |
| *B01J 35/10* | (2006.01) | |
| *B01J 37/03* | (2006.01) | |
| *B01J 37/04* | (2006.01) | |
| *B01J 37/12* | (2006.01) | |
| *B01J 21/00* | (2006.01) | |
| *B01J 23/00* | (2006.01) | |
| *B01J 25/00* | (2006.01) | |
| *B01J 29/00* | (2006.01) | |

(52) U.S. Cl.
CPC ............ *B01J 23/10* (2013.01); *B01D 53/945* (2013.01); *B01J 35/1038* (2013.01); *B01J 37/031* (2013.01); *B01J 37/04* (2013.01); *B01J 37/12* (2013.01); *C01G 25/00* (2013.01); *C01G 25/006* (2013.01); *B01D 2255/407* (2013.01); *B01D 2255/908* (2013.01); *C01P 2002/52* (2013.01); *C01P 2002/54* (2013.01); *C01P 2002/74* (2013.01); *C01P 2006/14* (2013.01)

(58) Field of Classification Search
USPC ................. 502/100, 300, 303, 304
See application file for complete search history.

(56) References Cited

U.S. PATENT DOCUMENTS

| 5,908,800 A | 6/1999 | Bonneau et al. |
|---|---|---|
| 5,958,827 A | 9/1999 | Suda et al. |
| 6,171,572 B1 | 1/2001 | Aozasa |
| 2003/0224931 A1* | 12/2003 | Yamamoto ............. C01G 25/00 502/304 |
| 2008/0020925 A1 | 1/2008 | Larcher et al. |
| 2008/0050593 A1* | 2/2008 | Okamoto ............... B01J 21/066 428/402 |
| 2009/0258781 A1* | 10/2009 | Maruki .................. C01G 25/00 502/304 |
| 2011/0064639 A1 | 3/2011 | Murota |
| 2011/0236282 A1* | 9/2011 | Southward ............ B01J 21/066 423/239.1 |
| 2015/0321175 A1* | 11/2015 | Ohtake .................. B01D 53/94 502/303 |

FOREIGN PATENT DOCUMENTS

| JP | 09-506587 A | 6/1997 |
|---|---|---|
| JP | 09-221304 A | 8/1997 |
| JP | 10-194742 A | 7/1998 |
| JP | 10-338525 A | 12/1998 |
| JP | 2007-524564 A | 8/2007 |
| JP | 2008-081392 A | 4/2008 |
| JP | 2009-249275 A | 10/2009 |
| WO | 2009/101984 A1 | 8/2009 |

OTHER PUBLICATIONS

Yasutaka Nagai et al., "Structure Analysis of $CeO_2$—$ZrO_2$ Mixed Oxides as Oxygen Storage Promoters in Automotive Catalysts", R&D Review of Toyota CRDL, Dec. 2002, pp. 20 to 27, vol. 37, No. 4.

Xiaohong Wang et al., "Structure, thermal-stability and reducibility of Si-doped Ce—Zr—O solid solution", Catalysis Today, 2007, pp. 412-419, vol. 126.

H.T. Zhang et al., "Thermal Stability and photoluminescence of $Zr_{1-x}Ce_xO_2$ ($0 \leq x \leq 1$) nanoparticles synthesized in a non-aqueous process", Materials Chemistry and Physics, 2007, pp. 415-422, vol. 101.

Jiang Xiaoyuan et al., "Preparation and characterization of high specific surface area $Ce_{0.5}Zr_{0.5}O_2$ mixed oxide", Indian Journal of Chemistry, Feb. 2004, pp. 285-290, vol. 43A.

International Searching Authority, International Search Report of PCT/JP2012/078324 dated Nov. 27, 2012.

(Continued)

*Primary Examiner* — James E McDonough
(74) *Attorney, Agent, or Firm* — Sughrue Mion, PLLC

(57) ABSTRACT

Provided are a composite oxide which is suitable as a co-catalyst for an exhaust gas purifying catalyst or the like, has high heat resistance, and has an excellent oxygen absorbing and desorbing capability at low temperatures and a method for producing the composite oxide. The composite oxide contains Ce and Zr, wherein the Ce content is 30 to 80 at % and the Zr content is 20 to 70 at %, based on the total of Ce and Zr being 100 at %, or further contains particular element M, wherein the Ce content is not less than 30 at % and less than 80 at %, the Zr content is not less than 20 at % and less than 70 at %, and the content of element M is more than 0 at % and not more than 15 at %, based on the total of Ce, Zr, and element M being 100 at %.

3 Claims, No Drawings

(56) References Cited

OTHER PUBLICATIONS

International Searching Authority, International Preliminary Report on Patentability dated Jun. 19, 2014, issued in corresponding International Application No. PCT/JP2012/078324.

Jiang et al., "Preparation of $La_2O_3$-doped $CeO_2$—$ZrO_2$ Solid Solution with High Thermal Stability by Water-in-Oil Microemulsion," Chemistry Letters, vol. 33, No. 8 (2004), pp. 1064-1065.

Wang et al., "Effect of additives on the structure characteristics, thermal stability, reducibility and catalytic activity of $CeO_2$—$ZrO_2$ solid solution for methane combustion", J Mater Sci, vol. 44 (2009), pp. 1294-1301.

* cited by examiner

COMPOSITE OXIDE

CROSS REFERENCE TO RELATED APPLICATIONS

This is Continuation Application of U.S. patent application Ser. No. 14/358,780 filed May 16, 2014, which is a National Stage of International Application No. PCT/JP2012/078324 filed Nov. 1, 2012, claiming priority based on Japanese Patent Application No. 2011-267329 filed Nov. 16, 2011, the contents of all of which are incorporated herein by reference in their entirety.

FIELD OF ART

The present invention relates to a composite oxide, in particular a composite oxide which may suitably be used as a co-catalyst for an exhaust gas purifying catalyst that purifies exhaust gas particularly from engines running on gasoline or light oil.

BACKGROUND ART

Exhaust gases from internal combustion engines of vehicles and the like contain hydrocarbons, carbon monoxide, and nitrogen oxide, which are harmful to human body and environment. As a catalyst for purifying vehicle exhaust gas, so-called a three way catalyst is used, which oxidizes carbon monoxide and hydrocarbons into carbon dioxide and water, and reduces nitrogen oxide into nitrogen and water. A three way catalyst is composed, for example, of a precious metal such as Pt, Pd, or Rh as a main catalyst, and an oxide or a composite oxide containing cerium oxide as a co-catalyst, both carried on a catalyst support, e.g., of alumina or cordierite. The co-catalyst absorbs oxygen due to change of valency of Ce contained therein from three to four in an oxidizing atmosphere, and desorbs oxygen due to change of the cerium valency from four to three in a reducing atmosphere, which is so-called oxygen absorbing and desorbing capability. This oxygen absorbing and desorbing capability mitigates abrupt change in an exhaust gas atmosphere caused by acceleration and deceleration of an engine, so as to allow the main catalyst to purify exhaust gas at high efficiency. The co-catalyst, while generally exhibiting high oxygen absorbing and desorbing capability at high temperatures, is required to exhibit sufficient oxygen absorbing and desorbing capability even at low engine temperatures, such as at the engine start, in particular, at lower temperatures of 400° C. or lower. Further, the co-catalyst, which carries a main catalyst precious metal thereon, proceeds to sinter when exposed to a high temperature exhaust gas, and as its specific surface area decreases, the main catalyst aggregates, failing to exhibit sufficient catalytic capacity. Thus, the co-catalyst is required to have heat resistance which enables maintenance of a large specific surface area even at high temperatures.

Patent Publication 1 discloses, as a composite oxide usable as a co-catalyst, a zirconium-cerium composite oxide which contains zirconium and cerium at a weight ratio of 51 to 95:49 to 5 in terms of oxides, has a specific surface area of not smaller than 50 m²/g after calcination at 500 to 1000° C., and is capable of maintaining a specific surface area of not smaller than 20 m²/g even after heating at 1100° C. for 6 hours.

Patent Publication 2 discloses a composite oxide which contains Ce and/or Pr and Zr at a particular ratio, is free of tetragonal crystal phases originated from zirconium oxide, and of which electron diffraction pattern appears as dotted diffraction spots. This composite oxide is described to have excellent oxygen absorbing and de sorbing capability at lower temperatures.

Non-patent Publication 1 teaches that enhancing the homogeneity of the Ce and Zr atoms in the $CeO_2$—$ZrO_2$ solid solution increases OSC (oxygen storage/release capacity) performance.

Patent Publication 1: JP-10-194742-A
Patent Publication 2: WO 2009/101984
Non-patent Publication 1: R&D Review of Toyota CRDL, Vol. 37, No. 4, p20-27

SUMMARY OF THE INVENTION

The composite oxide disclosed in Patent Publication 1 has high heat resistance, but is insufficient in oxygen absorbing and desorbing capability at low temperatures. The composite oxides disclosed in Patent Publication 2 and Non-patent Publication 1 have high oxygen absorbing and desorbing capabilities, but are insufficient in heat resistance.

It is an object of the present invention to provide a composite oxide which is suitable as a co-catalyst for an exhaust gas purifying catalyst or the like, has high heat resistance, and has an excellent oxygen absorbing and desorbing capability at low temperatures.

According to the present invention, there is provided a composite oxide comprising Ce and Zr, wherein a content of Ce is not less than 30 at % and not more than 80 at % and a content of Zr is not less than 20 at % and not more than 70 at %, based on a total of Ce and Zr being 100 at %, wherein said composite oxide has $CaF_2$-type structure phase or $CaF_2$-like structure phase, wherein a ratio of an actual lattice parameter in the (311) plane to theoretical lattice parameter (actual value/theoretical value) is 1.000, and wherein said composite oxide has a property of exhibiting a total pore volume of not less than 0.30 cc/g after calcination at 1000° C. for 5 hours in atmosphere.

According to the present invention, there is also provided a composite oxide further comprising at least one element M selected from the group consisting of alkaline earth metal elements, rare earth metal elements other than Ce, transition metal elements other than rare earth metal elements and Zr, halogen elements, B, C, Si, and S, wherein a content of Ce is not less than 30 at % and less than 80 at %, a content of Zr is not less than 20 at % and less than 70 at %, and a content of element M is more than 0 at % and not more than 15 at %, based on a total of Ce, Zr, and element M being 100 at %.

The composite oxide according to the present invention, having the above construction, has both high heat resistance and excellent oxygen absorbing and desorbing capability at low temperature s together, which have never been realized. Thus, the composite oxide of the present invention may suitably be used as a co-catalyst for an exhaust gas purifying catalyst and the like.

PREFERRED EMBODIMENTS OF THE INVENTION

The present invention will now be explained in detail.

The composite oxide according to the present invention contains Ce and Zr as essential elements, and may optionally contain at least one element M selected from the group consisting of alkaline earth metal elements, rare earth metal elements other than Ce, transition metal elements other than rare earth al elements and Zr, halogen elements, B, C, Si, and S.

According to the present invention where Ce and Zr are contained but element M is not, the content of each element other than oxygen is not less than 30 at % and not more than 80 at % of Ce and not less than 20 at % and not more than 70 at % of Zr, based on the total of Ce and Zr being 100 at %.

When element M is contained, the content of each element other than oxygen is not less than 30 at % and less than 80 at % of Ce, not less than 20 at % and less than 70 at % of Zr, and more than 0 at % and not more than 15 at % of element M, based on the total of Ce, Zr, and element M being 100 at %.

Ce and Pr, which is one of element M, exhibit oxygen absorbing and desorbing capability. With Pr, oxygen absorbing and desorbing capability at low temperatures may further be improved, but the composite oxide according to the present invention exhibits sufficient oxygen absorbing and desorbing capability at low temperatures even without Pr. Thus Pr, which is poorer in resources and more expensive than Ce, is not necessarily used, and even if used, in less amount than Ce, such as at not more than 15 at %.

Zr increases oxidation and reduction ratios (utilization ratio) of Ce and Pr, and improves heat resistance of the composite oxide. However, as mentioned above, it is Ce and optional Pr that exhibit oxygen absorbing and desorbing capability, so that too high a content of Zr may reduce the oxygen absorbing and desorbing capability per unit weight of the composite oxide. Thus the Zr content is at most 70 at %. At less than 30 at %, sufficient increase in utilization ratio and heat resistance may not be achieved. Zirconium salts in industrial use may contain a few atomic percent of Hf, and thus in the present invention, Hf is discussed as included in Zr.

For the reasons as discussed above and others, when Ce and Zr are contained but element M is not, the content of each element other than oxygen is preferably not less than 40 at % and not more than 60 at % of Ce and not less than 40 at % and not more than 60 at % of Zr, more preferably not less than 45 at % and not more than 55 at % of Ce and not less than 45 at % and not more than 55 at % of Zr, based on the total of Ce and Zr being 100 at %.

When element M is contained, the content of each element other than oxygen is preferably not less than 40 at % and less than 60 at % of Ce, not less than 40% and less than 60 at % of Zr, and more than 0 at % and not more than 10 at % of element M, more preferably not less than 45 at % and not more than 55 at % of Ce, not less than 45 at % and not more than 58 at % of Zr, and not less than 1 at % and not more than 10 at % of element M, based on the total of Ce, Zr, and element M being 100 a %.

In the preferred and more preferred ranges discussed above, both high heat resistance and excellent oxygen absorbing and desorbing capability at low temperatures are achieved at the same time at high levels.

In the composite oxide according to the present invention, element M represents one or more of alkaline earth metal elements, such as Mg, Ca, Sr, and Ba; rare earth metal elements other than Ce, such as Sc, Y, La, Nd, and Tb; transition metal elements other than rare earth metal elements and Zr, such as Ti, V, Nb, Ta, Cr, Mo, W, Mn, Fe, Co, Ni, Pd, Pt, Cu, Ag, Zn, Al, Ga, In, Ge, Sn, and Bi; halogen elements, such as F and Cl; and B, C, Si, and S. In particular, when at least one of La, Pr, and Y is contained as element M, heat resistance and oxygen absorbing and desorbing capability at low temperatures are preferably improved. La particularly improves heat resistance, and Pr and Y particularly improve oxygen absorbing and desorbing capability at low temperatures. In particular, when La and Pr and/or Y are contained together, these properties may be improved remarkably. When at least one of Fe, Co, Ni, Cu, Mn, Ti, and Sn is contained, oxygen absorbing and desorbing capability may preferably be improved. Elements other than these may be contained as inevitable impurities.

The composite oxide according to the present invention has the $CaF_2$-type structure phase or $CaF_2$-like structure phase, and the ratio of the actual lattice parameter in the (311) plane to the theoretical lattice parameter (actual value/theoretical value) is 1.000. In the present invention, the actual/theoretical value ratio is 1.000, which means that the value obtained by rounding off the figure in the fourth decimal place is 1.000. Confirmation of the crystal structure and the measurement of the lattice parameter are made by means of an X-ray diffractometer under the following conditions:

target: copper; tube voltage: 40 kV; tube current: 300 mA; divergence slit: 1°; scattering slit: 1°; receiving slit: 0.15 mm; operation mode: continuous; scan step: 0.02°; scan speed: 5°/min.

The composite oxide according to the present invention is preferably composed only of the $CaF_2$-type or $CaF_2$-like structure phase. The $CaF_2$-like structure phase refers to crystal phases which may be indexed as $CaF_2$-type structure phase by X-ray diffraction (XRD), and encompasses C-type rare earth structures, pyrochlore structure, and metastable phases wherein oxygen is introduced into the pyrochlore structure.

The ratio of an actual lattice parameter in the (311) plane to the theoretical lattice parameter (actual value/theoretical value) was calculated in the following manner from the angle at the diffraction peak (around $2\theta=58°$) of the XRD pattern determined in the (311) plane of the $CaF_2$-type or $CaF_2$-like structure phase under the conditions discussed above.

The theoretical value was determined from the theoretical lattice parameters of $ZrO_2$ and $CeO_2$ used proportionally to their contents. The actual value was calculated by the Bragg formulation of X-ray diffraction from the diffraction peak angle in the (311) plane determined under the conditions discussed above. Though the ratio of the actual lattice parameter to the theoretical was calculated without taking element M into particular consideration, it has been confirmed that the ratio is correlated with the performance to the extent sufficient for defining the composite oxide of the present invention.

In the composite oxide according to the present invention, the ratio of the actual lattice parameter in the (311) plane to the theoretical lattice parameter (actual value/theoretical value) is 1.000, which means that the composite oxide is almost a theoretical solid solution of Zr and optional element M in the $CaF_2$-type structure phase of Ce. In a high degree of solid solution, only a little lattice strain is generated upon absorption/desorption of oxygen to allow smooth entry/exit of oxygen, which is believed to provide significant effect particularly at low temperatures where oxygen is hard to migrate.

The composite oxide according to the present invention has a property of exhibiting a total pore volume of not less than 0.30 cc/g after calcination at 1000° C. for 5 hours in the atmosphere. A total pore volume after calcination at 1000° C. for 5 hours is indicative of heat resistance of a composite oxide. The composite oxide of the present invention, which is a high degree of solid solution as defined by the lattice parameter, and has a total pore volume of not less than 0.30 cc/g, has both excellent oxygen absorbing and desorbing capability at low temperatures and sufficient heat resistance together. The total pore volume is preferably not less than 0.35 cc/g, and the upper limit is not particularly restricted but usually about 0.45 cc/g. In the present invention, the total pore volume may be determined with Nova2000 (manufactured by Quantachrome) using nitrogen gas by BJH adsorption/desorption method.

The composite oxide according to the present invention also has a property of exhibiting oxygen storage capacity at 400° C. of preferably not less than 300 μmol per gram of the composite oxide, more preferably not less than 500 μmol/g, most preferably not less than 600 μmol/g. The maximum oxygen storage capacity is not particularly limited, and is usually about 700 μmol/g. In the present invention, the oxygen storage capacity of the composite oxide was measured in a gas adsorption system according to the following method.

First, under the flow of hydrogen gas at 0.07 MPa, 50 mg of a composite oxide sample was heated up to 400° C. over 1 hour and held for 10 minutes to reduce the sample. The sample was held at 400° C. until the measurement was finished. Then helium gas is introduced to thoroughly replace the hydrogen gas. One cubic centimeter of oxygen was precisely measured out in a measuring tube, and introduced into the sample tube to oxidize the sample. The amount of oxygen consumed here was quantified with a TCD (thermal conductivity detector) and taken as an oxygen storage capacity (μmol/g).

The composite oxide according to the present invention may be produced, for example, by a method including steps (a) to (d) of preparing by a wet method and calcining a precipitate according to the following procedures: step (a) of heating and holding an aqueous solution of zirconium containing zirconium ions; step (b) of mixing the aqueous solution of zirconium which had been heated and held, with an aqueous solution of cerium not less than 90 mol % of which cerium ions are tetravalent and which optionally contains ions of element M as required, to obtain a mixed aqueous solution, and heating and holding the mixed aqueous solution; step (c) of mixing the mixed aqueous solution which had been heated and held, with a precipitant containing a surfactant to obtain a precipitate; and step (d) of calcining the obtained precipitate in an oxidizing atmosphere.

Before step (a), an aqueous solution of zirconium containing zirconium ions, an aqueous solution of cerium containing cerium ions, and an alkaline aqueous solution containing a surfactant are prepared. As used herein, zirconium ions are $Zr^{4+}$ or $ZrO^{2+}$, and either one or both of these may be contained. The aqueous solution of cerium may optionally contain ions of element M as required.

The aqueous solutions of zirconium and cerium are prepared by dissolving respective salts of Ce, Zr, and optional element M in water. The salts of Zr, Ce, and element M may be water-soluble salts thereof, such as nitrates, sulfates, and acetates.

The alkaline aqueous solution may be prepared by dissolving, for example, ammonium, sodium hydroxide, potassium hydroxide, ammonium hydrogencarbonate, sodium carbonate, or sodium hydrogencarbonate, in water. The alkaline aqueous solution preferably contains alkali in 1.1 to 5 times the theoretical amount required for neutralizing and precipitating the zirconium ions, the cerium ions, and the ions of element M.

The surfactant may be, for example, anionic surfactants, such as ethoxycarboxylate, nonionic surfactants, such as alcohol ethoxylate, polyethylene glycol, carboxylic acid, and mixtures thereof, with carboxylic acid being particularly preferred. The carboxylic acid may preferably be, for example, saturated carboxylic acid, such as decanoic acid, lauric acid, myristic acid, and palmitic acid, with lauric acid being particularly preferred.

The content of the surfactant in the alkaline aqueous solution is usually about 1.0 to 3.5 wt %.

The heating and holding in step (a) is preferably at 90 to 100° C. for 5 to 12 hours, more preferably at 95 to 98° C. for 7 to 10 hours. Heating and holding the zirconium aqueous solution promotes hydrolytic reaction to generate fine particles containing hydroxide, oxyhydroxide, or oxide of Zr, or hydrates thereof. The hydrolytic reaction is promoted more when the solution is heated and held at higher temperature for longer period of time. However, the generated fine Zr particles, if oxidized or grown too far, may hard to be mixed with Ce and optional element M uniformly in step (b), so that it is preferred to suitably decide the conditions of heating and holding in step (a) depending on the state of the zirconium aqueous solution before the heating and holding.

The concentration of the zirconium aqueous solution is preferably 10 to 100 g/L, more preferably 10 to 50 g/L, in terms of $ZrO_2$. A lower concentration of the zirconium aqueous solution promotes the hydrolytic reaction more easily, but tends to lower the productivity, whereas a higher concentration tends to suppress the hydrolytic reaction.

In step (b), inclusion of tetravalent cerium ions in the cerium aqueous solution promotes the hydrolytic react ion more easily. The ratio of tetravalent cerium ions in the cerium aqueous solution is preferably not less than 95 mol %.

The heating and holding of the mixed aqueous solution in step (b) is preferably at 90 to 100° C. for 15 to 25 hours, more preferably at 98 to 100° C. for 18 to 20 hours. Heating and holding the mixed aqueous solution promotes hydrolytic reaction to generate fine particles of hydroxide or oxide of Ce, or hydrates thereof. At the same time, these fine particles are mixed uniformly with the fine Zr particles mentioned above. Here, the fine Zr particles and part of the fine Ce particles undergo repeated dissolution and precipitation to mix at the atomic level, and the particles of Zr and Ce uniformly mixed at the atomic level grow further.

The temperature and duration of the heating and holding affect the hydrolytic reaction of cerium ions and the dissolution and precipitation of the fine Zr and Ce particles, and are assumed to affect the degree of solid solution associated with oxygen adsorbing and desorbing capability and the total pore volume associated with heat resistance, of the eventually resulting composite oxide.

The concentration of the mixed aqueous solution is preferably 20 to 100 g/L, more preferably 30 to 70 g/L of the total of Ce and optional element M, in terms of $CeO_2$ and the oxide obtained by calcination of element M at 1000° C. in the atmosphere, respectively.

It is important to carry out step (b) following step (a). Hydrolytic reaction of a zirconium salt is hard to proceed in the presence of a cerium salt. In view of this, step (a) is carried out in the absence of a cerium salt, so that the conditions may freely be set to generate the fine Zr particles without too much oxidation or growth of the generated fine particles. After that, by mixing with the cerium aqueous solution and heating and holding in step (b), fine Ce particles are generated in the close vicinity of the fine Zr particles, and these particles undergo repeated dissolution and precipitation to form particles wherein Ce and Zr are uniformly mixed at the atomic level, which particles are further grown. By growing the particles into a certain size in this step, excessive calcination may be suppressed in the following calcining step or in later use of the resulting composite oxide at high temperatures, and composite oxide may be obtained which has high heat resistance, is in high degree of solid solution, and has excellent oxygen absorbing and desorbing capability.

The precipitate formed in step (c) may be recovered by filtration, e.g., through a Nutsche filter or a filter press, or by centrifugation. In recovering, the precipitate is preferably washed, which may be carried out by a conventional process, such as decantation. The recovered precipitate may be dried prior to the following step. Alternatively, spray drying the slurry will directly give dried precipitate.

By step (c), precipitate containing Ce, Zr, and optionally element M, is obtained. The obtained precipitate is in the form the particles generated in step (b) among which the surfactant is dispersed. The surfactant functions as a so-called pore former to make the precipitate into a porous composite oxide through the following calcining step. Such a porous composite oxide may be prevented from excessive calcination in high temperature use to provide improved heat resistance.

In step (d), the calcining may be carried out in an oxidizing atmosphere. The conditions of the calcination are not particularly limited as long as the precipitate obtained in step (c) is decomposed and oxidized into a composite oxide, which has $CaF_2$-type or $CaF_2$-like structure phase, in which the ratio of an actual lattice parameter in the (311) plane to the theoretical (actual value/theoretical value) is 1.000, and which has a property of exhibiting a total pore volume of not less than 0.30 cc/g after calcination at 1000° C. for 5 hours in the atmosphere. The calcination may usually be carried out at not lower than 300° C. and not higher than 1200° C. for not less than 0.5 hours and not more than 24 hours. The calcination may be performed in two or more steps. For example, the precipitate may be calcined in two steps including the first calcination step at not lower than 200° C. and not higher than 500° C. for not less than 0.5 hours and not more than 24 hours, and the second calcination step at not lower than 1000° C. and not higher than 1200° C. for not less than 0.5 hours and not more than 24 hours.

The production method preferably includes, after step (d), step (e) of calcining in a reducing atmosphere. This step (e) may be carried out usually at not lower than 800° C., preferably not lower than 1000° C. and not higher than 1200° C. for not less than 0.5 hours and not more than 24 hours. Like the calcination in an oxidizing atmosphere discussed above, this step (e) may also be in two steps.

In step (e), the reducing atmosphere may be a reducing atmosphere containing hydrogen or carbon monoxide, or a mixed gas atmosphere of hydrogen and an insert gas, such as argon or helium. In view of safety and efficiency, a mixed gas atmosphere of hydrogen and an inert gas is preferred.

The composite oxide obtained through additional step (e) is given a further improved solid solution state of the elements and better lattice arrangement, i.e., higher crystallinity, so that the lattice strain upon oxygen adsorption/desorption may further be reduced. This allows smooth entry/exit of oxygen, which is believed to provide significant oxygen adsorption/desorption at low temperatures where oxygen is hard to migrate.

The production method further preferably includes, after step (e), step (f) of calcining in an oxidizing atmosphere. This calcination step may be carried out in the same way as the calcination of the precipitate discussed above. After this step, calcination in a reducing atmosphere and calcination in an oxidizing atmosphere may suitably be carried out.

EXAMPLES

The present invention will now be explained in more detail with reference to Examples and Comparative Examples, which are not intended to limit the present invention.

In the following examples, the compositions of the obtained composite oxides were confirmed with an ICP atomic emission spectrometer to be the same as those of their respective raw materials.

Example 1

Using an aqueous solution of zirconyl nitrate as a raw material, an aqueous solution of zirconium at a concentration of 15 g/L in terms of $ZrO_2$ was prepared. One litter of this zirconium aqueous solution was placed in a container equipped with a cooling tube and a stirrer, and heated and held at 98° C. for 8 hours under stirring.

Then, to the zirconium aqueous solution cooled down to the room temperature, 60 ml of an aqueous solution of cerium nitrate at a concentration of 200 g/L in terms of $CeO_2$, 95 mol % of which cerium ions in terms of $CeO_2$ were tetravalent, and 10 ml of an aqueous solution of lanthanum nitrate at a concentration of 300 g/L in terms of $La_2O_3$ were added to obtain a mixed aqueous solution. This mixed aqueous solution was heated and held at 98° C. for 20 hours under stirring.

Next, to the mixed aqueous solution cooled down to the room temperature, 315 ml of 12.5 mass % aqueous ammonia containing 6.8 g of ammonium laurate was added over 20 minutes under stirring. The pH of the mixed aqueous solution with the aqueous ammonia added was 9.5. Then, the resulting precipitate was subjected to repeated Nutsche filtration and decantation.

The obtained precipitate was calcined at 400° C. for 5 hours in the atmosphere, ground in a mortar, and calcined again at 1000° C. for 2 hours in the atmosphere to obtain a composite oxide.

The obtained composite oxide was subjected to the measurements of XRD, a 400° C. oxygen storage capacity, and a total pore volume after calcination at 1000° C. for 5 hours in the atmosphere, by the methods discussed above. As a result, it was determined that the obtained composite oxide contained only the crystal phases which were indexed as the $CaF_2$-type structure phase, had a ratio of the actual lattice parameter in the (311) plane to the theoretical (actual value/theoretical value) of 1.000, a 400° C. oxygen storage capacity of 323 µmol/g, a total pore volume after calcination at 1000° C. for 5 hours in the atmosphere of 0.378 cc/g.

Examples 2 to 10

Composite oxides were obtained in the same way as in Example 1 except that the mixing ratios of the raw material aqueous solutions were changed to the compositions as show in Table 1. As the Pr and Y resources added to the raw material aqueous solutions, an aqueous solution of praseodymium nitrate and an aqueous solution of yttrium nitrate were used, respectively. The obtained composite oxides were subjected to the measurements in the same way as in Example 1. The results are shown in Table 1. Composite oxides containing only the crystal phases which were indexed as the $CaF_2$-type structure phase were indicated simply as $CaF_2$ in Table 1.

Examples 11 to 20

Precipitates were prepared in the same way as in Examples 1 to 10, respectively. Composite oxides were obtained in the same way as in Example 1 except that the samples obtained by calcining the precipitate at 400° C. for 5 hours in the atmosphere were calcined at 1000° C. for 1 hour in the flow of hydrogen at 2 L/min, and then at 700° C. for 5 hours in the air. The obtained composite oxides were subjected to the measurements in the same way as in Example 1. The results are shown in Table 1.

Examples 21 to 23

Composite oxides were obtained in the same way as in Example 11 except that the mixing ratios of the raw material aqueous solutions were changed to the compositions as shown in Table 1. As the Nd and Gd resources added to the raw material aqueous solutions, an aqueous solution of neodymium nitrate and an aqueous solution of gadolinium nitrate were used, respectively. The obtained composite oxides were subjected to the measurements in the same way as in Example 1. The results are shown in Table 1.

Comparative Example 1

A composite oxide was obtained in the same way as in Example 1 except that the zirconium aqueous solution was not heated and held and the mixed aqueous solution was heated and held at 98° C. for 20 hours under stirring. The obtained composite oxide was subjected to the measurements in the same way as in Example 1. The results are shown in Table 1. Composite oxides containing not only the crystal phases which were indexed as the $CaF_2$-type structure phase but also the tetragonal phases originated from $ZrO_2$ were indicated as $CaF_2$+t-$ZrO_2$ in Table 1.

Comparative Example 2

The zirconium aqueous solution was not heated and held, and 315 mol of 12.5 mass % aqueous ammonia without ammonium laurate was added to the mixed aqueous solution over 20 minutes. The resulting precipitate was subjected to repeated Nutsche filtration and decantation. Then, 6.8 g of ammonium laurate was added to the obtained precipitate and thoroughly mixed. Other than the above, the calcination was carried out in the same way as in Example 11 to obtain a composite oxide. The obtained composite oxide was subjected to the measurements in the same way as in Example 1. The results are shown in Table 1.

Comparative Examples 3 and 4

Composite oxides were obtained in the same way as in Example 11 except that the mixing ratios of the raw materials was changed as shown in Table 1. The obtained composite oxides were subjected to the measurements in the same way as in Example 1. The results are shown in Table 1.

TABLE 1

| | Zr (mol %) | Ce (mol %) | M (mol %) | Crystal phase | Lattice parameter ratio (actual/theoretical) | Total pore volume (cc/g) | Oxygen storage capacity (400° C.) (μmol/g) |
|---|---|---|---|---|---|---|---|
| Example 1 | 58 | 33 | La 9 | $CaF_2$ | 1.000 | 0.378 | 323 |
| Example 2 | 24 | 73 | La 3 | $CaF_2$ | 1.000 | 0.340 | 510 |
| Example 3 | 48 | 48 | La 2, Pr 2 | $CaF_2$ | 1.000 | 0.376 | 381 |
| Example 4 | 48 | 48 | La 2, Y 2 | $CaF_2$ | 1.000 | 0.376 | 400 |
| Example 5 | 45 | 51 | La 2, Pr 1, Y 1 | $CaF_2$ | 1.000 | 0.375 | 384 |
| Example 6 | 50 | 46 | La 2, Y 2 | $CaF_2$ | 1.000 | 0.378 | 396 |
| Example 7 | 50 | 50 | — | $CaF_2$ | 1.000 | 0.347 | 301 |
| Example 8 | 48 | 48 | La 4 | $CaF_2$ | 1.000 | 0.376 | 341 |
| Example 9 | 49 | 49 | Pr 2 | $CaF_2$ | 1.000 | 0.354 | 365 |
| Example 10 | 49 | 49 | Y 2 | $CaF_2$ | 1.000 | 0.355 | 362 |
| Example 11 | 58 | 33 | La 9 | $CaF_2$ | 1.000 | 0.389 | 539 |
| Example 12 | 24 | 73 | La 3 | $CaF_2$ | 1.000 | 0.349 | 638 |
| Example 13 | 48 | 48 | La 2, Pr 2 | $CaF_2$ | 1.000 | 0.388 | 635 |
| Example 14 | 48 | 48 | La 2, Y 2 | $CaF_2$ | 1.000 | 0.387 | 667 |
| Example 15 | 45 | 51 | La 2, Pr 1, Y 1 | $CaF_2$ | 1.000 | 0.385 | 640 |
| Example 16 | 50 | 46 | La 2, Y 2 | $CaF_2$ | 1.000 | 0.389 | 658 |
| Example 17 | 50 | 50 | — | $CaF_2$ | 1.000 | 0.356 | 502 |
| Example 18 | 48 | 48 | La 4 | $CaF_2$ | 1.000 | 0.388 | 568 |
| Example 19 | 49 | 49 | Pr 2 | $CaF_2$ | 1.000 | 0.365 | 609 |
| Example 20 | 49 | 49 | Y 2 | $CaF_2$ | 1.000 | 0.366 | 603 |
| Example 21 | 48 | 48 | Nd 4 | $CaF_2$ | 1.000 | 0.360 | 587 |
| Example 22 | 48 | 48 | Gd 4 | $CaF_2$ | 1.000 | 0.359 | 585 |
| Example 23 | 50 | 48 | Nd 2 | $CaF_2$ | 1.000 | 0.361 | 581 |
| Comp. Ex. 1 | 58 | 33 | La 9 | $CaF_2$ + t-$ZrO_2$ | 1.003 | 0.208 | 226 |
| Comp. Ex. 2 | 58 | 33 | La 9 | $CaF_2$ + t-$ZrO_2$ | 1.007 | 0.098 | 194 |
| Comp. Ex. 3 | 75 | 20 | La 3, Pr 2 | $CaF_2$ + t-$ZrO_2$ | 1.010 | 0.355 | 236 |
| Comp. Ex. 4 | 15 | 82 | La 3 | $CaF_2$ | 0.995 | 0.213 | 229 |

What is claimed is:

1. A method for producing a composite oxide comprising Ce and Zr, wherein a content of Ce is not less than 30 at % and not more than 80 at % and a content of Zr is not less than 20 at % and not more than 70 at %, based on a total of Ce and Zr being 100 at %, wherein said composite oxide has $CaF_2$-type structure phase or $CaF_2$-like structure phase, wherein a ratio of an actual lattice parameter in the (311) plane to theoretical lattice parameter (actual value/theoretical value) is 1.000, and wherein said composite oxide has a property of exhibiting a total pore volume of not less than 0.30 cc/g after calcination at 1000° C. for 5 hours in atmosphere;

said method comprising the steps of:
(a) heating and holding an aqueous solution of zirconium containing zirconium ions at 90 to 100° C. for 5 to 12 hours,
(b) mixing said aqueous solution of zirconium heated and held, with an aqueous solution of cerium not less than 90 mol % of which cerium ions are tetravalent, to obtain a mixed aqueous solution, and heating and holding said mixed aqueous solution at 90 to 100° C. for 15 to 25 hours,
(c) mixing said mixed aqueous solution heated and held, with a precipitant containing a surfactant to obtain a precipitate, and
(d) calcining said precipitate in an oxidizing atmosphere at 300 to 1200° C. for 0.5 to 24 hours.

2. The method according to claim 1, wherein the aqueous solution of cerium in step (b) further comprises ions of at least one element M selected from the group consisting of alkaline earth metal elements, rare earth metal elements other than Ce, transition metal elements other than rare earth metal elements and Zr, halogen elements, B, C, Si, and S, wherein, in said composite oxide, a content of Ce is not less than 30 at % and less than 80 at %, a content of Zr is not less than 20 at % and less than 70 at %, and a content of element M is more than 0 at % and not more than 15 at %, based on a total of Ce, Zr, and element M being 100 at %.

3. The method according to claim 2, wherein the element M is selected from the group consisting of La, Pr, and Y.

* * * * *